United States Patent
Kim et al.

(10) Patent No.: US 8,583,819 B2
(45) Date of Patent: Nov. 12, 2013

(54) SYSTEM AND METHOD FOR CONTROLLING SERVER USAGE IN PEER-TO-PEER (P2P) BASED STREAMING SERVICE

(75) Inventors: Young Wook Kim, Seongnam-si (KR); Chang Hee Woo, Seongnam-si (KR); Jong Soo Kim, Seongnam-si (KR); Jung Jun Park, Seongnam-si (KR); Seung Kwan Yang, Seongnam-si (KR); Jae Won Oh, Seongnam-si (KR); Sang Hyun Lee, Seongnam-si (KR)

(73) Assignee: NHN Business Platform Corporation, Kyunggi-do (KR)

(*) Notice: Subject to any disclaimer, the term of this patent is extended or adjusted under 35 U.S.C. 154(b) by 160 days.

(21) Appl. No.: 13/304,337

(22) Filed: Nov. 24, 2011

(65) Prior Publication Data

US 2012/0137017 A1 May 31, 2012

(30) Foreign Application Priority Data

Nov. 25, 2010 (KR) ........................ 10-2010-0118066

(51) Int. Cl.
*G06F 15/16* (2006.01)
(52) U.S. Cl.
USPC ........... 709/231; 709/219; 709/222; 709/221; 709/220; 709/236; 709/235; 709/226; 709/217; 709/204; 709/234; 705/51; 705/28; 705/30; 705/34; 705/57; 370/236; 370/238; 370/232; 370/230; 370/254

(58) Field of Classification Search
USPC ......... 709/231, 219, 222, 221, 220, 236, 235, 709/217, 204, 234
See application file for complete search history.

(56) References Cited

U.S. PATENT DOCUMENTS

| | | | |
|---|---|---|---|
| 7,738,406 B2* | 6/2010 | Liu et al. | 370/256 |
| 7,752,168 B2* | 7/2010 | Sudhakar | 707/638 |
| 7,996,547 B2* | 8/2011 | Sudhakar | 709/229 |
| 2008/0098123 A1 | 4/2008 | Huang et al. | |
| 2008/0134258 A1 | 6/2008 | Goose et al. | |

(Continued)

FOREIGN PATENT DOCUMENTS

| | | |
|---|---|---|
| JP | 2004-343417 | 12/2004 |
| KR | 10-2006-0017695 | 2/2006 |

(Continued)

OTHER PUBLICATIONS

Non-Final Office Action issued on May 20, 2013 in U.S. Appl. No. 13/353,582.

*Primary Examiner* — Jude Jean Gilles
(74) *Attorney, Agent, or Firm* — Harness, Dickey & Pierce, P.L.C.

(57) ABSTRACT

Provided is a system and method for controlling server usage in a peer-to-peer (P2P) based streaming service. The system to control server usage in a peer-to-peer based streaming service includes a concurrent connections number providing unit to calculate a number of peer clients concurrently connected to the peer-to-peer based streaming service; a non-transitory memory to store the number of peer clients concurrently connected to the peer-to-peer based streaming service; and a server usage controlling unit to control server usage for the peer-to-peer based streaming service based on a ratio of a variable associated with an influx rate of peer clients to the number of peer clients concurrently connected to the peer-to-peer based streaming service.

20 Claims, 9 Drawing Sheets

(56) References Cited

U.S. PATENT DOCUMENTS

| | | |
|---|---|---|
| 2008/0201424 A1 | 8/2008 | Darcie |
| 2008/0263057 A1 | 10/2008 | Thompson |
| 2009/0187653 A1* | 7/2009 | Fu et al. ........................ 709/224 |
| 2009/0303897 A1 | 12/2009 | Kouretas et al. |
| 2010/0083268 A1 | 4/2010 | Morris |
| 2011/0106965 A1 | 5/2011 | Chun et al. |
| 2012/0137017 A1* | 5/2012 | Kim et al. ..................... 709/231 |
| 2013/0018991 A1 | 1/2013 | Kim et al. |
| 2013/0024583 A1 | 1/2013 | Kim et al. |

FOREIGN PATENT DOCUMENTS

| | | |
|---|---|---|
| KR | 10-2007-0102896 | 10/2007 |
| KR | 10-2007-0103801 | 10/2007 |
| KR | 10-2008-0022857 | 3/2008 |

\* cited by examiner

SYSTEM AND METHOD FOR CONTROLLING SERVER USAGE IN PEER-TO-PEER (P2P) BASED STREAMING SERVICE

CROSS-REFERENCE TO RELATED APPLICATION

This application claims priority from and the benefit of Korean Patent Application No. 10-2010-0118066, filed on Nov. 25, 2010, which is hereby incorporated by reference for all purposes as if fully set forth herein.

BACKGROUND OF THE INVENTION

1. Field of the Invention

Exemplary embodiments of the present invention relate to a system and method for controlling server usage in a peer-to-peer (P2P) based streaming service.

2. Discussion of the Background

A peer-to-peer (P2P) service refers to a service in which data or information is received directly from peer terminals such as personal computers that are connected to a network such as the Internet, and may be different from a conventional scheme of searching for information on the Internet using a search engine.

Further, 'streaming' refers to a technology for playback of a file by receiving the file in real time through a network. For example, progressive streaming is one type of streaming technologies.

When the streaming technology is applied to a P2P technology, server load or service load may be reduced, such that cost reduction for the server operation may be realized. In order to achieve the foregoing, a client using a P2P-based streaming service may incorporate a function for the P2P-based streaming service into a content player to play back a content, such as a multimedia file, and communicates with a server providing the P2P-based streaming service. More particularly, a server may provide a list of contents available on a web page, and the client may select a desired content in the list by clicking the desired content. When the content is selected, the content player installed in the client is executed to play back the selected content. The content player plays back the selected content by receiving the content from the server and other peers using the P2P-based streaming technology. The client and other peers may also be referred to as a peer client.

If a user of the client accesses a server to use P2P-based streaming service and selects a content, a peer having the selected content is identified and connected to the client in order to provide the content to the client. That is, the content player of the client plays back file pieces of the selected content by receiving the file pieces of the content from the server or other connected peers having the content.

In a P2P-based streaming service, server usage is determined in advance by computing a maximum sharing ratio based on a prediction for the number of expected online visitors (the number of expected concurrent users or the number of expected concurrent connections). However, an initial server usage is much higher than the server usage at the peak number of concurrent connections. Thus, it is difficult to calculate more accurate network cost because of the difficulty of an accurate prediction for the number of concurrent connections in advance. A service provider pays more network cost due to the high initial server usage since the network cost is determined based on the peak of server usage. Thus, there is a problem of paying more network usage cost.

The above information disclosed in this Background section is only for enhancement of understanding of the background of the invention and therefore it may contain information that does not form any part of the prior art nor what the prior art may suggest to a person of ordinary skill in the art.

Hereinafter, a system and method for dynamically determining server usage will be provided.

SUMMARY OF THE INVENTION

Exemplary embodiments of the present invention provide a system and method for adaptively controlling server usage based on the number of online visitors occupying a server and an influx rate of online visitors.

Exemplary embodiments of the present invention also provide a system and method for maintaining low server traffic regardless of the number of online visitors, by controlling server usage based on a ratio of a variable to the number of online visitors occupying a server, the variable determined based on an influx rate of online visitors.

Additional features of the invention will be set forth in the description which follows, and in part will be apparent from the description, or may be learned by practice of the invention.

An exemplary embodiment of the present invention discloses a system to control server usage in a peer-to-peer based streaming service, including a concurrent connections number providing unit to calculate a number of peer clients concurrently connected to the peer-to-peer based streaming service; a non-transitory memory to store the number of peer clients concurrently connected to the peer-to-peer based streaming service; and a server usage controlling unit to control server usage for the peer-to-peer based streaming service based on a variable associated with an influx rate of peer clients to the number of peer clients concurrently connected to the peer-to-peer based streaming service.

An exemplary embodiment of the present invention discloses a system to control server usage, including a packetizing server to receive a data stream, and to index at least one piece of the data stream; a delivery server to receive the indexed at least one piece of the data stream from the packetizing server, and to transmit the indexed at least one piece of the data stream to a peer client in accordance with a request from the peer client; and an index server to maintain a list of peer clients. The server usage of the delivery server is controlled based on a number of online visitors concurrently connected to the delivery server and an influx rate of online visitors.

An exemplary embodiment of the present invention discloses a method that uses a processor to control server usage in a peer-to-peer based streaming service, including providing a number of online visitors concurrently connected to a peer-to-peer based streaming service; and controlling, using the processor, server usage for the peer-to-peer based streaming service based on a ratio of a variable to the number of online visitors concurrently connected to the peer-to-peer based streaming service. The variable is determined based on an influx rate of online visitors.

An exemplary embodiment of the present invention discloses a method that uses a processor to control server usage, including maintaining a list of at least one peer client and providing the list of at least one peer client in response to a search request; receiving a data stream and indexing at least one piece of the data stream; and transmitting, using the processor, the indexed at least one piece of the data stream to the at least one peer client in accordance with a request from the at least one peer client. The server usage is controlled based on a ratio of a variable to a number of online visitors concurrently connected to a peer-to-peer based server, and the variable is determined based on an influx rate of online visitors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
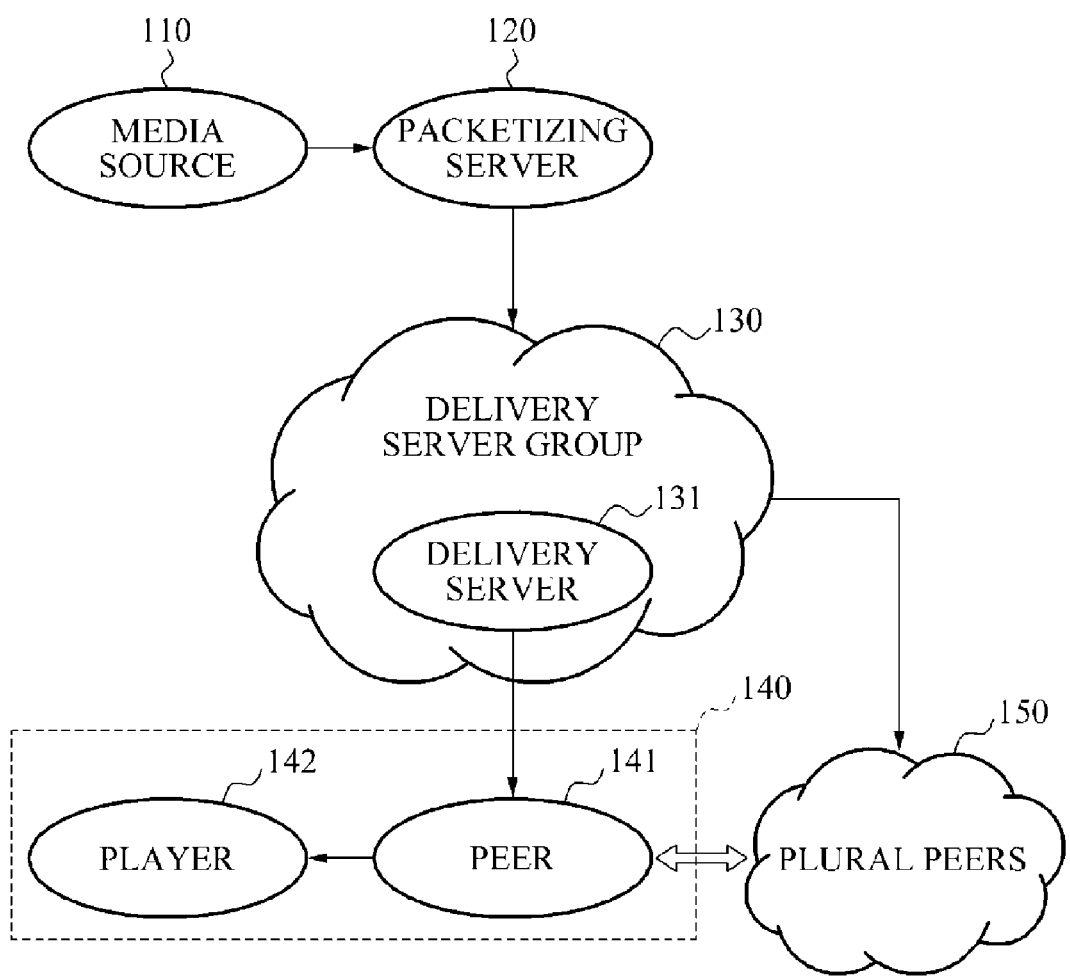
FIG. 1 is a diagram illustrating a schematic configuration of a system to provide a peer-to-peer (P2P) based streaming service according to an exemplary embodiment of the present invention.

Exemplary embodiments now will be described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). It will be understood that when an element is referred to as being "connected to" another element, it can be directly connected to the other element, or intervening elements may be present.

FIG. 1 is a diagram illustrating a schematic configuration of a system to provide a peer-to-peer (P2P) based streaming service according to an exemplary embodiment of the present invention. As shown in FIG. 1, the system includes a media source 110, a packetizing server 120, a delivery server group 130, a client 140, and a plurality of peers 150.

The media source 110 may include an encoder to provide a data stream. The packetizing server 120 may receive the data stream from the media source 110 and may index at least one piece of the received data stream. One of various schemes that are already known may be used as a method of indexing at least one piece of a data stream in order to provide the data stream through a P2P service. More than one packetizing server 120 that corresponds to each media source 110 may be used. For example, it may be assumed that four professional baseball games are simultaneously broadcasted. When four media sources 110 are provided for the four games, four packetizing servers 120 may be used for the four media sources 110, respectively. Each media source 110 and/or services therefrom may be referred to as a channel. Further, corresponding streaming services and corresponding servers for each of the multiple media sources 110 may be distinguished by channel information. If one or more packetizing servers 120 correspond to each of media sources 110, a corresponding packetizing server 120 for each media source 110 may also be referred to as a channel. The packetizing server 120 will be further described later with reference to FIG. 3.

The delivery server group 130 may include at least one delivery server 131. The number of delivery servers 131 operated in the delivery server group 130 may be controlled based on the number of online visitors concurrently connected to the delivery server group 130. The delivery servers 131 operated in the delivery server group 130 may be referred to as active delivery servers. The number of online visitors may be the number of peer clients concurrently connected to the delivery server group 130. Further, the number of online visitors may be the number of peer clients concurrently connected to the delivery server group 130 for a specific content if multiple contents are delivered by the delivery server group 130. The delivery server 131 may receive, from the packetizing server 120, the indexed at least one piece of the data stream and may buffer the at least one piece of the data stream.

The delivery server 131 may transmit the at least one piece of the data stream to the client 140 in accordance with a request from the client 140.

The client 140 may refer to a user terminal, for example, a personal computer (PC), a mobile terminal and the like, and may also include a peer 141 and a player 142 as illustrated in FIG. 1. The peer 141 may receive the at least one piece of the data stream from at least one of the delivery server 131 and the plurality of peers 150, and may transmit the data stream to the player 142. For example, the peer 141 may correspond to a program installed and executable in the client 140. Each of the plurality of peers 150 may also be installed and executable in a plurality of clients, respectively.

The data stream converted into the at least one piece at the packetizing server 120 may be transmitted to at least some of all connected clients through the delivery server group 130. From a point of view of the single client 140, the at least one piece of the data stream may be received from the delivery server 131 and/or other clients, and the data stream may be transmitted to the player 142, whereby the user may receive the P2P-based streaming service.

The server usage controlling system according to an embodiment of the present invention may refer to the system described with reference to FIG. 1, or may be included in or connected to the system described with reference to FIG. 1. The server usage controlling system may adaptively control the server usage based on the number of online visitors, thereby constantly maintaining low server traffic regardless of the number of online visitors. The server usage may be controlled based on a ratio of a variable to the number of online visitors concurrently connected to a server, and the variable may be determined based on an influx rate of online visitors. For example, the server usage may be computed as expressed by Equation 1.

$$\text{Server Usage} = c/n, \qquad [\text{Equation 1}]$$

where 'c' denotes a variable determined based on an influx rate of online visitors, and 'n' denotes the number of online visitors occupying a server. The number of online visitors occupying a server may be referred to as the number of online visitors concurrently connected to a server, or the concurrent connections number. Further, 'c' may correspond to a variable determined by an administrator or a system through an empirical test. 'c' may be determined to be a relatively larger value when the influx rate of the online visitors is higher, and may be determined to be a relatively smaller value when the influx rate is lower. Equation 1 may indicate that traffic for 'c' users may be used to cover 'n' users. For example, when 'c' corresponds to six, traffic for six users may be used to cover all 'n' users, that is, all online visitors occupying the server. Further, 'n' and 'c' may be separately calculated for each channel.

The variable 'c' may be set as a constant in consideration of influx rate of online visitors. The variable 'c' may be preset based on a prediction obtained from previous data of the influx rate of online visitors and/or the number of online visitors occupying a server, and may be determined through an empirical test. Further, as 'n' increases, the server usage of each online visitor may decrease because the server usage of each online visitor is inversely proportional to 'n'. However, total server usages for a channel may be substantially constant because the number of online visitors connected to the channel increases to 'n'.

Further, the variable 'c' may be expressed by the following equation; $c = k \cdot f(i)$, where $f(i)$ may be a function of 'i' that increases as 'i' increases. The $f(i)$ may be a monotonically increasing function. For example, $c = k \cdot i$. That is, the variable 'c' may be proportional to the influx rate of online visitors 'i'. Further, coefficient 'k' may be determined through the empirical test. Thus, the variable 'c' may be dynamically controlled according to the change of the influx rate of online visitors 'i'.

Although the number of online visitors occupying the server increases due to an increase in the influx rate of the online visitors, the server usage may gradually decrease since the variable 'c' may be fixed or properly controlled, whereas 'n' may increase. Accordingly, low server usage may be constantly maintained regardless of the number of the online visitors.

In order to achieve the foregoing, the server usage controlling system may include a concurrent connections number providing unit (now shown) to provide the number of online visitors occupying a server, and a server usage controlling unit (not shown) to control the server usage based on a ratio of the variable to the number of online visitors occupying the server. As noted above, the variable may be determined based on an influx rate of online visitors.

Figure 2:
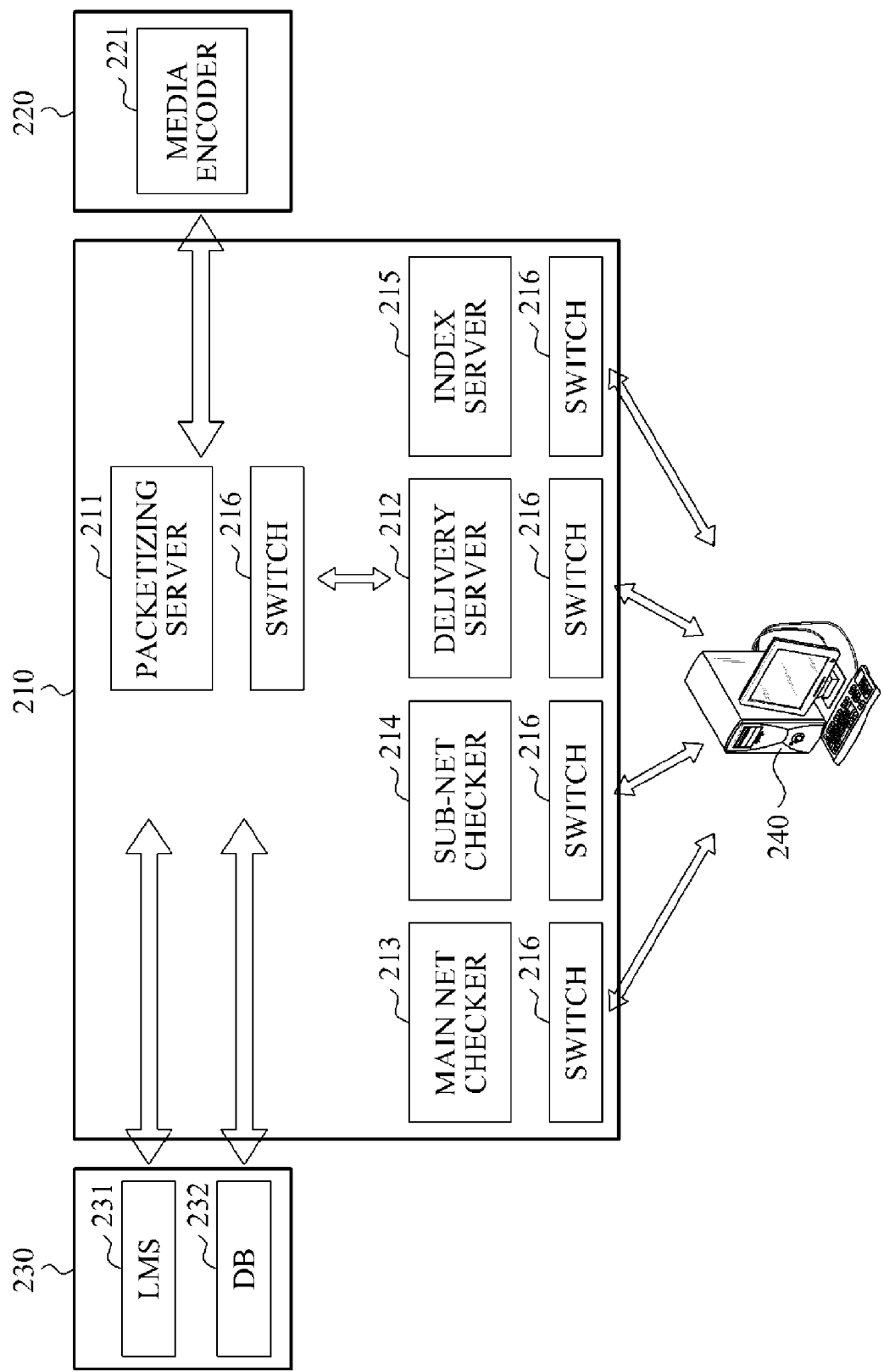
FIG. 2 is a diagram illustrating a physical configuration of a system to provide a P2P-based streaming service according to an exemplary embodiment of the present invention.

FIG. 2 is a diagram illustrating a physical configuration of a system to provide a P2P-based streaming service according to an exemplary embodiment of the present invention. FIG. 2 illustrates an external Internet data center (IDC) 210 to provide equipment for a P2P-based streaming service, an encoder apparatus 220 to provide a data stream, and an internal IDC 230 to manage a process for providing the data stream to a client 240 by the external IDC 210.

The external IDC 210 may include a packetizing server 211, a main net checker 213, a sub-net checker 214, a delivery server 212, an index server 215, and a plurality of switches 216. Each of the packetizing server 211, the delivery server 212, the main net checker 213, the sub-net checker 214, and the index server 215 may include a plurality of servers, rather than a single server. Each of the plurality of switches 216 may be used to transmit data to a corresponding server or to receive data from the corresponding server, among the plurality of servers. For example, an L4 switch may be used as each of the plurality of switches 216.

The packetizing server 211 may receive the data stream from a media encoder 221 of the encoder apparatus 220 and may process the received data stream to pieces of data to be used in the server usage controlling system. That is, the packetizing server 211 may convert the data stream into a plurality of pieces. As aforementioned, each packetizing server 211 may be operated in a corresponding media encoder 221.

Figure 3:
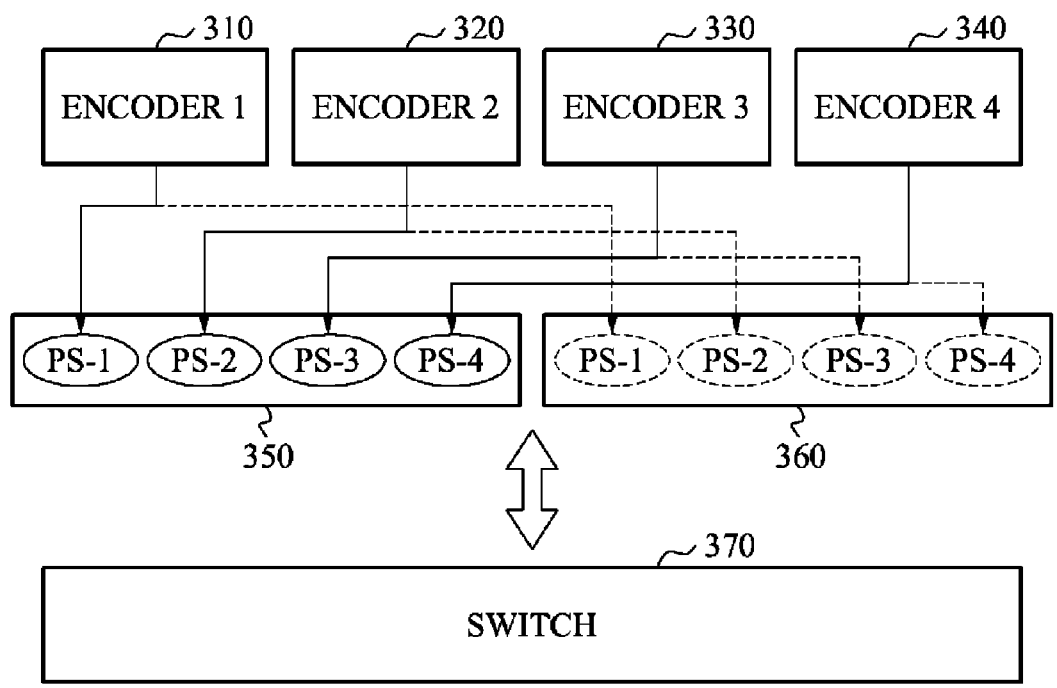
FIG. 3 is a diagram illustrating a dualization of a packetizing server according to an exemplary embodiment of the present invention.

The delivery server 212 may transfer, to the client 240, the at least one piece of the data stream received from the packetizing server 211, in accordance with a request from the client 240. Also, the index server 215 may maintain a list of clients and may provide a search service. Through the search service, a connected peer client having one or more desired pieces of the data stream may be searched for. The search service may be performed for each channel. The list of clients may also be searched for by each connected client. Further, the list of clients may be distinguished by multiple sub-lists of connected clients per content item (e.g., per channel or per media source). Referring to FIG. 3, for example, the four encoders 310, 320, 330, and 340 may provide a first content, a second content, a third content, and a fourth content, respectively. The list of clients may include a first sub-list of connected clients for the first content, a second sub-list of connected clients for the second content, a third sub-list of connected clients for the third content, and a fourth sub-list of connected clients for the fourth content. The influx rate of online visitors and the number of online visitors concurrently connected to the P2P based streaming server may be separately calculated for each content item. Further, the influx rate of online visitors and the number of online visitors concurrently connected to the P2P based streaming server may be calculated for a portion of or all the content items provided by the P2P streaming server. Further, a connected client may search for other connected peers, data stored in a buffer of other connected clients including at least one piece of a streaming data using the search service provided by the index server 215. The main net checker 213 and the sub-net checker 214 may refer to relay servers to relay connections between peers.

Table 1 shows an example of the number of servers used when the number of online visitors corresponds to 150,000, a content bit rate corresponds to 500 kilobytes per second (kbps), and a sharing ratio corresponds to 80%. The sharing ratio may be sharing ratio of a piece of the streaming data among peer clients. Further, the sharing ratio may be calculated for each channel. The sharing ratio may be determined based on server usage in a channel and total number of pieces received by peers connected to the channel. The sharing ratio may be monitored and be used to determine the variable 'c'.

TABLE 1

| Server | Performance | Number of Servers Used |
| --- | --- | --- |
| Index Server | Support 10,000 per an Index Server | 15 + 1 |
| Delivery Server | Support 800 Mbps per a Delivery Server | 18 + 1 |
| Packetizing Server | No Performance Issue | 2 (primary/secondary) |

A Live cast Management System (LMS) 231 included in the internal IDC 230 may refer to a peer management system. The LMS 231 may correspond to a server to manage the packetizing server 211, the delivery server 212, and the index server 215. The LMS 231 may monitor an upload and download state of a server, traffic, the number of queries, a resource, for example, a central processing unit (CPU) and a memory, a sharing ratio, and the like. Also, the LMS 231 may generate statistical data about the number of online visitors, the number of unique visitors, a sharing ratio, a user rate distribution, an average amount of viewing time, the number of channels viewed, and the like, and may store the generated statistical data in a database (DB) 232. That is, the DB 232 may refer to a server to store the statistical data. The user rate distribution may include information on the data transmission rate of each connected peer client. The average amount of viewing time may include average amount of viewing time for each media source. The number of channels viewed may include the number of media source requested by peer clients.

The server usage may be stored in the index server 215, and each online visitor connected to a delivery server may use the delivery server according to the server usage stored in the index server.

The server usage controlling system may adaptively control the server usage based on the number of online visitors in real time, thereby constantly maintaining low server traffic regardless of the number of online visitors. The server usage may be controlled based on a ratio of a variable to the number of online visitors occupying a server, and the variable may be determined based on an influx rate of the online visitors. For example, the server usage may be computed as expressed by Equation 1, and the server usage may indicate traffic of the delivery server 212 described with reference to FIG. 2. Also, the server usage controlling system described with reference to FIG. 1 may refer to the system described with reference to FIG. 2, or may be included in the LMS 231 or the index server 215. Further, traffic usage of the delivery server 212 may be controlled by the server usage controlling system according to the influx rate of online visitors and the number of online visitors concurrently connected to a delivery server. The influx rate of online visitors and the number of online visitors concurrently connected to a delivery server may be separately calculated and applied for each channel. Further, server usage control may also be applied independently for each channel.

FIG. 3 is a diagram illustrating a dualization of a packetizing server according to an exemplary embodiment of the present invention. FIG. 3 may indicate that four packetizing servers may be operated in a main packetizing server group 350 if a data stream is provided through four encoders 310, 320, 330, and 340. That is, a PS-1, a PS-2, a PS-3, and a PS-4 may indicate the four packetizing servers.

The four packetizing servers may convert each of the data streams that are received from each of the four encoders 310, 320, 330, and 340 into at least one data piece that may be used in P2P, and may transmit the converted data to active delivery servers. The four packetizing servers and the delivery servers may transmit and receive the data using a switch 370.

The packetizing servers may use a smaller portion of a resource, for example, a CPU, traffic, and the like. For example, when twenty delivery servers are accessed and the number of online visitors occupying a server corresponds to 150,000, less than or equal to 20 Megabits per second (Mbps)-traffic may be used for a 1-Mbps content.

Since different data streams may be transmitted from the four encoders 310, 320, 330, and 340 to each packetizing server PS-1, PS-2, PS-3, and PS-4, a piece of a data stream may be generated in either the main packetizing server group 350 or a sub-packetizing server group 360, as illustrated in FIG. 3. Accordingly, the main packetizing server group 350 and the sub-packetizing server group 360 may be operated in an active/standby form. The sub-packetizing server group 360 may be used in replacement of the main packetizing server group 350.

Figure 4:
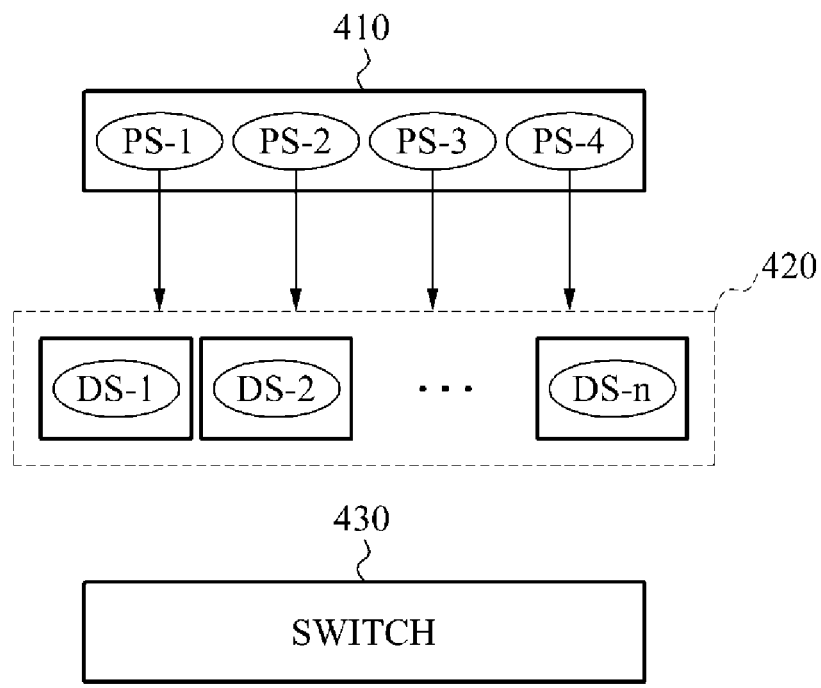
FIG. 4 is a diagram illustrating a dualization of a delivery server according to an exemplary embodiment of the present invention.

FIG. 4 is a diagram illustrating a dualization of a delivery server according to an exemplary embodiment of the present invention. Pieces corresponding to data converted by a packetizing server group 410 may be transmitted to a delivery server group 420. The 'DS-n' may refer to an 'nth' delivery server, and may indicate that 'n' delivery servers may be included in the delivery server group 420. Activated number of delivery servers may be determined based on the number of online visitors.

Each of the delivery servers may receive at least one piece of a data stream from a packetizing server, and may perform buffering on a certain number of pieces, and may transmit the corresponding pieces to peers in accordance with requests from the peers corresponding to clients. Further, delivery servers included in the delivery server group 420 may be bound to a switch 430 as well, and traffic may be controlled by increasing the number of active delivery servers in accordance with an increase in the number of online visitors.

Figure 5:
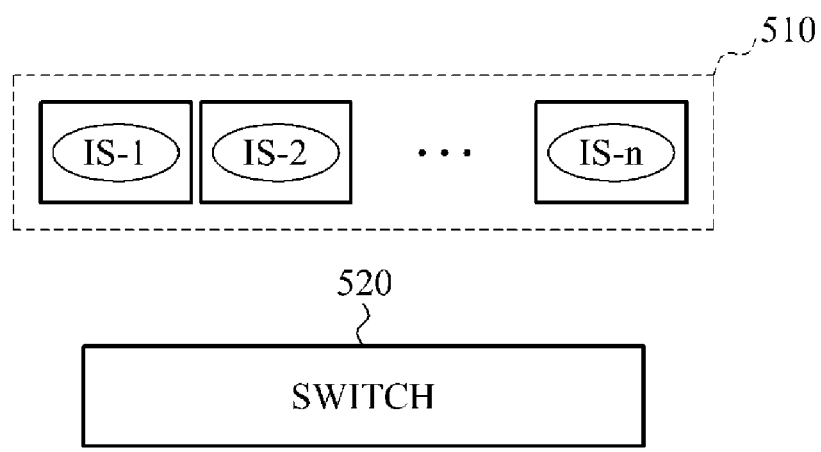
FIG. 5 is a diagram illustrating a dualization of an index server according to an exemplary embodiment of the present invention.

FIG. 5 is a diagram illustrating a dualization of an index server according to an exemplary embodiment of the present invention. An index server group 510 may include a plurality of index servers. The 'IS-n' may refer to an 'nth' index server, and may indicate that 'n' index servers may be included in the index server group 520.

Each of the plurality of index servers may manage peers corresponding to clients. More particularly, each of the plurality of index servers may manage peers installed in the clients, and may transfer a search result in response to requests from the peers. Also, the index servers may perform a message transfer, and may maintain a continuous connection with the peers. Each of the index servers may be bound to a switch 520, and the number of index servers may be increased based on the number of online visitors.

Figure 6:
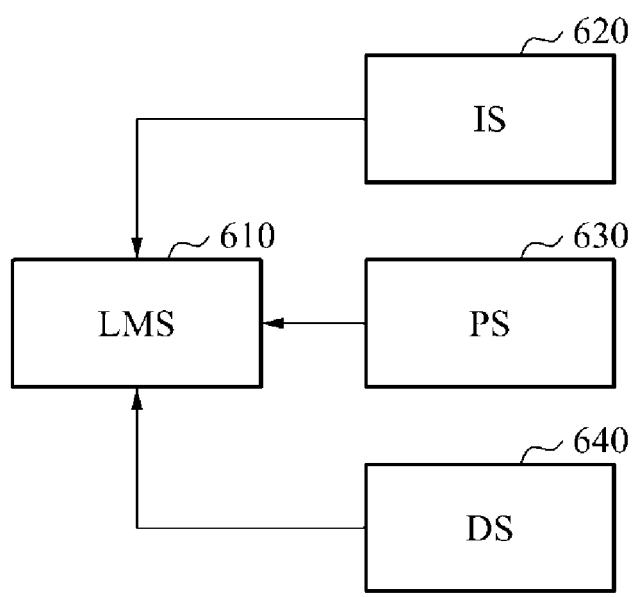
FIG. 6 is a diagram illustrating a peer management system according to an exemplary embodiment of the present invention.

FIG. 6 is a diagram illustrating a peer management system according to an exemplary embodiment of the present invention. In FIG. 6, an LMS 610 may refer to a peer management system, and an IS 620 may refer to an index server, a PS 630 may refer to a packetizing server, and a DS 640 may refer to a delivery server. The peer management system may perform management, distribution, update, and monitoring functions on the index server 620, the packetizing server 630, and the delivery server 640, and may also perform statistical data collection and analysis functions on a peer. For example, the peer management system may monitor states of the index server 620, the packetizing server 630, and the delivery server 640, for example, CPU usage, memory usage or traffic, and may provide an event alert function in response to an error or an unfavorable situation through a short message service (SMS), or an e-mail.

Figure 7:
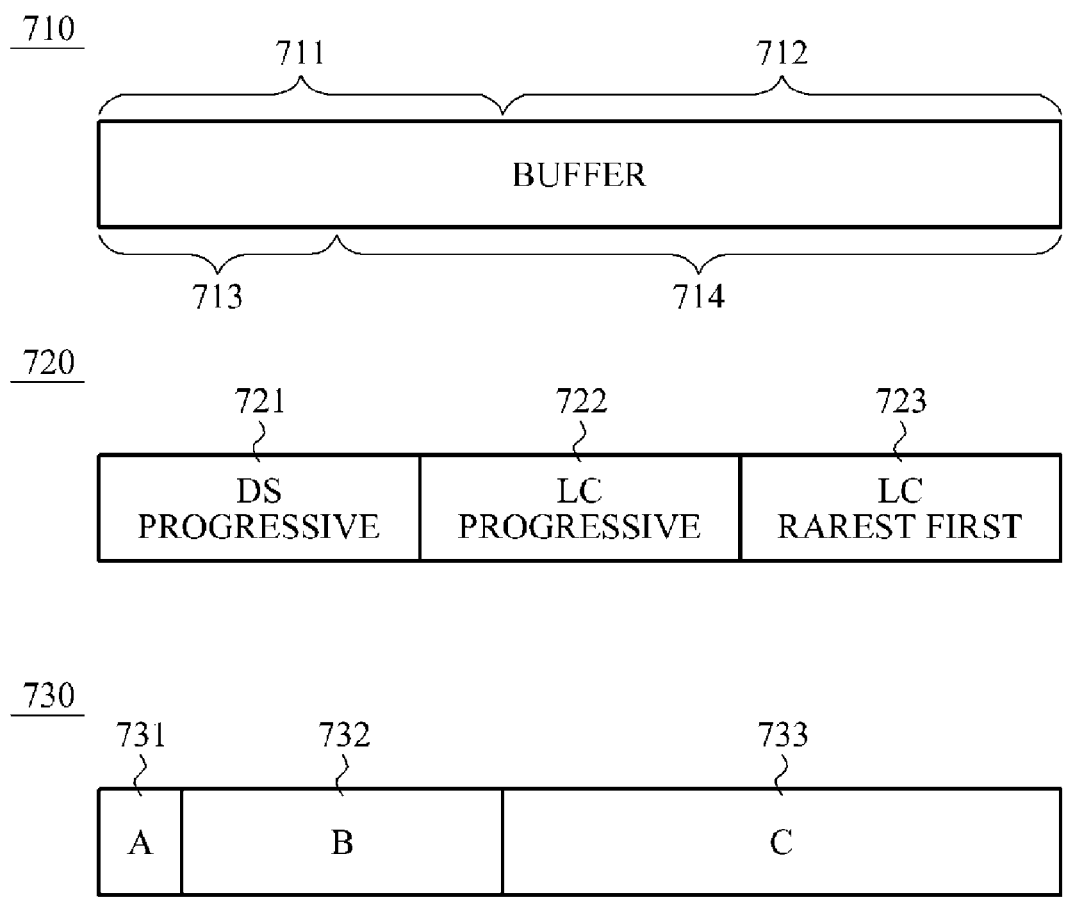
FIG. 7 is a diagram illustrating a buffer structure in a peer according to an exemplary embodiment of the present invention.

FIG. 7 is a diagram illustrating a buffer structure in a peer according to an exemplary embodiment of the present invention. A peer may correspond to software that may be installed and executed in a client, and the peer may determine which piece is to be received, and from where the corresponding piece is to be received. Table 2 shows methods of selecting a piece in a peer, and available sources.

TABLE 2

| Piece Selecting Method | Available Source |
| --- | --- |
| Rarest First | Delivery Server |
| Progressive | Other peer |

In Table 2, 'Rarest First' may refer to a piece selecting method in which a rarest piece on a network may be received first, and 'Progressive' may refer to a piece selecting method in which pieces may be received sequentially starting from the header. The piece may be received from the delivery server, or other peers.

The peer may use a buffer to store the received pieces, for a smooth playback and a high sharing efficiency.

FIG. 7 illustrates a first buffer 710, a second buffer 720, and a third buffer 730.

The first buffer 710 may be classified into a first region 711 to store the received pieces using 'Progressive,' and a second region 712 to store the received pieces using 'Rarest First.' Further, the first buffer 710 may be classified into a third region 713 to store the pieces received from the delivery server, and a fourth region 714 to store the pieces received from other peers.

The second buffer 720 may indicate regions of a buffer, which may be actually classified. The second buffer 720 may be classified into a first region 721 to store the pieces received from the delivery server using 'Progressive,' a second region 722 to store the pieces received from other peers using 'Progressive,' and a third region 723 to store the pieces received from other peers using 'Rarest First.'

The third buffer 730 may indicate that sizes of classified regions may be different. The third buffer 730 may include a region A 731, a region B 732, and a third region C 733, each having different size. For example, the sizes of the region A 731, the region B 732, and the region C 733 may be proportioned 1:4:16, respectively. The proportions may be changed based on the number of online visitors and server status. Also, a portion of the pieces may be received from the server, and may be stored in the region B 732 and the region C 733. The server may be a delivery server.

Further, the server usage controlling system may generate buffer control information. The buffer control information may be sent to each connected peer client to control buffer allocations. The buffer control information may include information on the size of a buffer space for pieces received from the delivery server and the size of a buffer space for pieces received from other peer clients. Further, the buffer control information may include information on a ratio between the buffer space for pieces received from the delivery server and the buffer space for pieces received from other peer clients. For example, each connected peer client may control the size of the third region 713, and the fourth region 714, based on the buffer control information. Further, each connected peer client may control the size of the third region C 733, based on the buffer control information.

Figure 8:
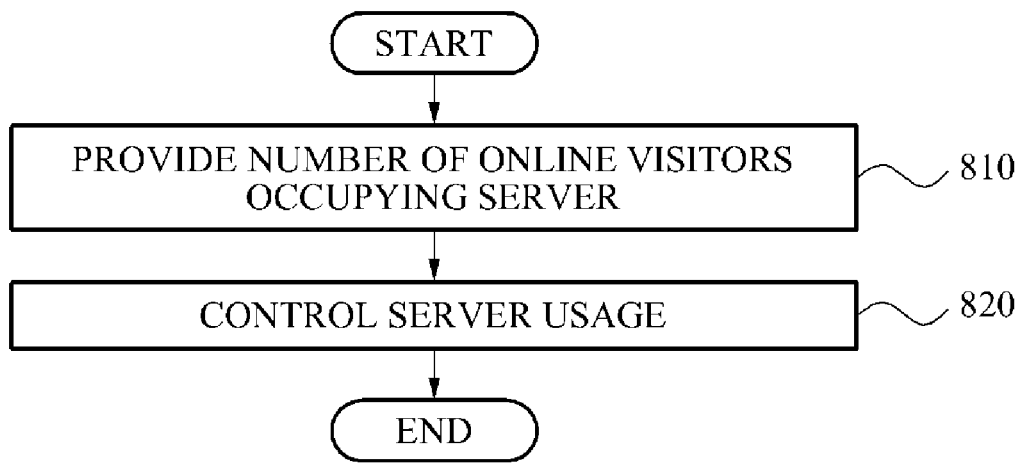
FIG. 8 is a flowchart illustrating a method for controlling server usage in a P2P-based streaming service according to an exemplary embodiment of the present invention.

FIG. 8 is a flowchart illustrating a method for controlling server usage in a P2P-based streaming service according to an exemplary embodiment of the present invention. The method for controlling server usage may be performed by the server usage controlling system described with reference to FIG. 1 and FIG. 2.

In operation 810, the server usage controlling system may provide information on the number of online visitors occupying a server. As aforementioned, a live cast management system may manage the number of online visitors, and the server usage controlling system may receive and provide the number of the online visitors that is managed by the live cast management system.

In operation 820, the server usage controlling system may control the server usage based on a ratio of a variable to the number of online visitors occupying the server, the variable may be determined based on an influx rate of online visitors. The variable determined based on the influx rate of the online visitors may be determined to be a relatively larger value when the influx rate is higher, and may be determined to be a relatively smaller value when the influx rate is lower.

In addition, the number of active delivery servers transmitting at least one piece of a data stream to at least one client may be determined based on the server usage. The at least one client may include a buffer to temporarily store the at least one piece of the data stream. The buffer may include a first region to store the at least one piece of the data stream received from the delivery server using 'Progressive' that is a piece selecting scheme for sequentially receiving at least one piece of a data stream, a second region to store at least one piece of a data stream received from another client using 'Progressive,' and a third region to store the at least one piece of the data stream received from another client or a delivery server using 'Rarest First' that is a piece selecting scheme for first receiving a rarest piece of a data stream on a network.

Figure 9:
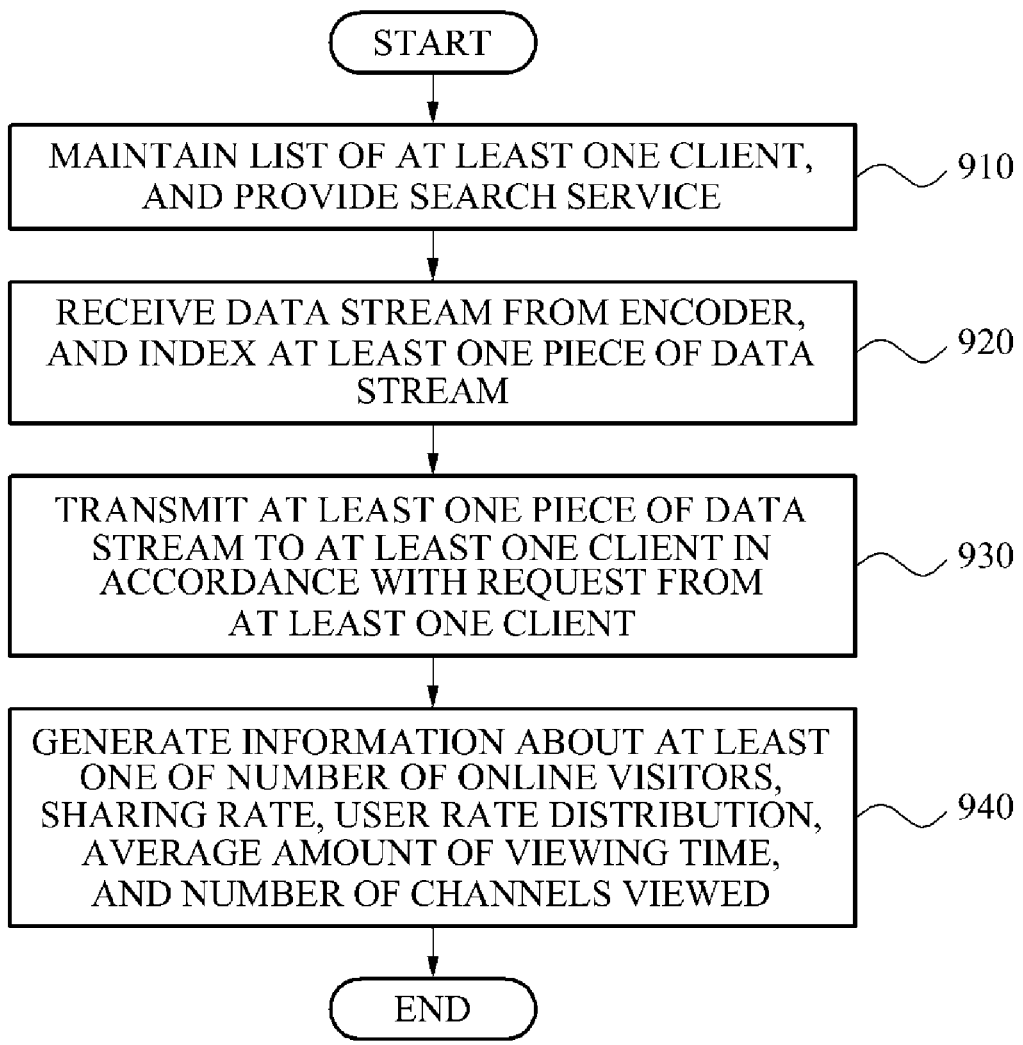
FIG. 9 is a flowchart illustrating a method for controlling server usage in a P2P-based streaming service according to an exemplary embodiment of the present invention.

FIG. 9 is a flowchart illustrating a method for controlling server usage in a P2P-based streaming service according to an exemplary embodiment of the present invention. The method for controlling server usage may be performed by the server usage controlling system described with reference to FIG. 1 and FIG. 2.

In operation 910, the server usage controlling system may maintain a list of at least one client, and may provide a search service. In operation 920, the server usage controlling system may receive a data steam from an encoder and may index at least one piece of the received data stream. In operation 930, the server usage controlling system may transmit the at least one piece of the data stream to the at least one client in accordance with a request from the at least one client. In operation 940, the server usage controlling system may generate information about at least one of the number of online visitors, a sharing ratio, a user rate distribution, an average amount of viewing time, and the number of channels viewed. The server usage may be controlled based on a ratio of a variable to the number of online visitors occupying a server, the variable may be determined based on an influx rate of online visitors. The variable may be determined to be a relatively larger value when the influx rate is higher and may be determined to be a relatively smaller value when the influx rate is lower.

In addition, the number of delivery servers transmitting at least one piece of a data stream to at least one client may be determined based on the server usage. The at least one client may include a buffer to temporarily store the at least one piece of the data stream. The buffer may include a first region to store the at least one piece of the data stream received from the delivery server using 'Progressive' that is a piece selecting scheme for sequentially receiving pieces of a data stream, a second region to store at least one piece of a data stream received from another client using 'Progressive,' and a third region to store the at least one piece of the data stream received from another client using 'Rarest First' that is a piece selecting scheme to receive the rarest piece of a data stream on a network first ("rarest first order"). Specifically, under the 'Progressive' scheme, a peer client receives pieces of the data stream in a sequential order from the first piece of the data stream to the last piece of the data stream. Under the 'Rarest First' scheme, the peer client searches for the rarest piece of the data stream among connected peer clients and receives pieces of the data stream in a sequential order from the rarest piece of the data stream to the most common piece of the data stream.

Further, the number of peer clients to which pieces of the data stream are sent may be determined based on the server usage. The number of pieces and the transmission scheme of pieces of the data stream to be sent from the active delivery servers in a determined period of time may also be determined based on the server usage. Further, a ratio of pieces of the data stream to be sent using a progressive scheme to pieces of the data stream to be sent using a rarest first scheme may be determined based on the server usage. Further, a ratio of pieces of the data stream to be sent from the delivery servers to pieces of the data stream to be sent from other peer clients may be determined based on the server usage.

The server usage controlling system may control server usage of one or more delivery servers by setting maximum traffic usage based on the influx rate of online visitors and the number of online visitors concurrently connected to a delivery server. The maximum traffic usage may be set for each delivery server and for each channel. By controlling the maximum traffic usage, traffic usage from peer clients may also be controlled indirectly. An index server may manage concurrent connections by maintaining a list of connected peer clients and may allocate one or more delivery servers according to the concurrent connections. The operation of the index server may be performed independently for each channel.

In the system and method according to exemplary embodiments of the present invention, server usage may be adaptively controlled based on an influx rate of online visitors and the number of online visitors concurrently connected to a server, and the server usage may be determined based on a ratio of a variable to the number of online visitors concurrently connected to the server. The variable may be determined based on the influx rate of the online visitors, thus low server traffic may be constantly maintained regardless of the number of the online visitors.

The method according to exemplary embodiments of the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system to control server usage in a peer-to-peer based streaming service, the system comprising:
   a concurrent connections number providing unit to calculate a number of peer clients concurrently connected to the peer-to-peer based streaming service;
   a non-transitory memory to store the number of peer clients concurrently connected to the peer-to-peer based streaming service; and
   a server usage controlling unit to control server usage for the peer-to-peer based streaming service based on a variable associated with an influx rate of peer clients and the number of peer clients concurrently connected to the peer-to-peer based streaming service.

2. The system of claim 1, further comprising one or more delivery servers to transmit at least one piece of a data stream to the peer clients in an active state, wherein a number of active delivery servers is determined based on the server usage.

3. The system of claim 1, wherein the server usage controlling unit determines a number of pieces of a data stream transmitted from one or more delivery server, based on the server usage.

4. The system of claim 1, wherein the server usage controlling unit determines a ratio of pieces of a data stream to be sent using a progressive scheme to pieces of the data stream to be sent using a rarest first scheme, based on the server usage.

5. The system of claim 1, wherein the server usage controlling unit determines a ratio of pieces of a data stream to be sent from one or more delivery servers to pieces of the data stream to be sent from other peer clients, based on the server usage.

6. The system of claim 1, wherein the variable is determined to be a relatively larger value in response to a determination that the influx rate is changed to a higher value and the variable is determined to be a relatively smaller value in response to a determination that the influx rate is changed to a lower value.

7. A system to control server usage, the system comprising:
   a packetizing server to receive a data stream, and to index at least one piece of the data stream;
   a delivery server to receive the indexed at least one piece of the data stream from the packetizing server, and to transmit the indexed at least one piece of the data stream to a peer client in accordance with a request from the peer client; and
   an index server to maintain a list of peer clients,
   wherein server usage of the delivery server is controlled based on a number of online visitors concurrently connected to the delivery server and an influx rate of online visitors.

8. The system of claim 7, wherein
   the peer client comprises a buffer to store the indexed at least one piece of the data stream, and
   the buffer comprises a first region to store the indexed at least one piece of the data stream received from the delivery server using a progressive scheme, a second region to store at least one piece of a data stream received from another peer client using the progressive scheme, and a third region to store at least one piece of the data stream received from another peer client using a rarest first scheme,
   the progressive scheme is a piece selecting scheme to sequentially receive pieces of a data stream, and
   the rarest first scheme is a piece selecting scheme to receive a rarest piece of a data stream first.

9. The system of claim 7, further comprising:
   a server managing unit to manage the packetizing server, the delivery server, and the index server, and to manage information about at least one of the number of online visitors, a sharing ratio, a user rate distribution, an average amount of viewing time, and a number of channels viewed.

10. A method that uses a processor to control server usage in a peer-to-peer based streaming service, the method comprising:
    providing a number of online visitors concurrently connected to the peer-to-peer based streaming service; and
    controlling, using the processor, server usage for the peer-to-peer based streaming service based on a ratio of a variable to the number of online visitors concurrently connected to the peer-to-peer based streaming service,
    wherein the variable is determined based on an influx rate of online visitors.

11. The method of claim 10, further comprising determining a number of active delivery servers based on the server usage, wherein the active delivery servers transmit at least one piece of a data stream to at least one peer client.

12. The method of claim 11, wherein
    the at least one peer client comprises a buffer to store the at least one piece of the data stream for a determined period of time, and
    the buffer comprises multiple regions to store the at least one piece of the data stream, and
    wherein the multiple regions are distinguished based on whether the at least one piece of the data stream is received from the delivery server or another peer client, or the multiple regions are distinguished based on whether the at least one piece of the data stream is received using a progressive scheme that is a piece selecting scheme for sequentially receiving at least one piece of the data stream or using a rarest first scheme that is a piece selecting scheme for first receiving a rarest piece of a data stream.

13. A method that uses a processor to control server usage, the method comprising:
    maintaining a list of at least one peer client and providing the list of at least one peer client in response to a search request;
    receiving a data stream and indexing at least one piece of the data stream; and
    transmitting, using the processor, the indexed at least one piece of the data stream to the at least one peer client in accordance with a request from the at least one peer client,
    wherein the server usage is controlled based on a ratio of a variable to a number of online visitors concurrently connected to a peer-to-peer based server, and the variable is determined based on an influx rate of online visitors.

14. The method of claim 13, wherein the variable is determined to be a relatively larger value in response to a determination that the influx rate is changed to a higher value and the variable is determined to be a relatively smaller value in response to a determination that the influx rate is changed to a lower value.

15. The method of claim 13, wherein
    the at least one peer client comprises a buffer to store the indexed at least one piece of the data stream for a determined period of time, and
    the buffer comprises a first region to store the indexed at least one piece of the data stream received from a delivery server using a first piece selecting scheme, a second region to store at least one piece of the data stream received from another peer client using the first piece selecting scheme, and a third region to store the at least one piece of the data stream received from the delivery server or another peer client using a second piece selecting scheme.

16. The method of claim 13, further comprising generating information about at least one of the number of online visitors, a sharing ratio, a user rate distribution, an average amount of viewing time, and a number of channels viewed.

17. The method of claim 13, further comprising generating buffer control information for reallocating buffer spaces of the at least one peer client.

18. The method of claim 13, further comprising setting a maximum traffic usage of a delivery server based on the ratio of the variable to the number of online visitors concurrently connected to the peer-to-peer based server.

19. A non-transitory computer-readable medium comprising a program for instructing a computer, when executed by a processor, to perform the method of claim 10.

20. A non-transitory computer-readable medium comprising a program for instructing a computer, when executed by a processor, to perform the method of claim 13.

* * * * *